FIG. 1

INVENTORS
PRESTON D. JANES
MYRLIN B. JANES

BY

*Carl Fissell Jr.*

AGENT

United States Patent Office 3,232,262
Patented Feb. 1, 1966

3,232,262
AUTOMATIC PILOT
Preston Douglas Janes, West Chester, Pa. (101 Sea Spray St., Daytona Beach, Fla.), and Myrlin Bernard Janes, 719 Knox Road, Villanova, Pa.
Filed Sept. 22, 1964, Ser. No. 398,251
10 Claims. (Cl. 114—144)

The present invention relates to non-hunting automatic pilot control apparatus and has for its primary purpose to hold a moving object on a manually selected, predetermined course relative to the earth's magnetic field. Another object of the present invention is to maintain a magnetic compass in substantially a fixed relation to the earth's magnetic field, irrespective of the pitching or rolling of the object upon which it is mounted. A still further object of the present invention is to establish direct control over the steering mechanism of the moving object by a visual magnetic compass heading and/or relay apparatus e.g. a relay meter, so as to avoid the necessity for frequent and periodic course corrections and to minimize course overshoot and hunting.

Another object of the present invention is to provide an automatic pilot steering drive and control mechanism which may be coupled simply, rapidly and efficiently to a vehicle steering unit with minimum modification to said unit, thereby providing manual selection control over such apparatus.

In accordance with the foregoing objects and first briefly described, the present invention comprises a compass binnacle in which a pair of spaced, light-sensitive cells are located on an arcuate path (180° apart). Illuminating means is disposed adjacent each cell for projecting light towards the cells. A magnetic control screen is mounted for movement relative to a moving object, e.g. a ship and the earth's magnetic field, in an arcuate path between the cells and the respective illuminating means and adapted to occlude the cells during circular movement of the screen. Electromagnetic control means is connected to the cells for automatically actuating the steering mechanism of the ship when a cell becomes energized by the impingement of light thereon and wherein manually preset conditions are attained. Further included is feedback loop means for coupling the angular movement of the steering mechanism (rudder turning rate) into an angular displacement of the compass which is directly proportional to the vehicle angle of attack and in the same direction as the vehicle movement effective to prevent course correction overshoot and to minimize the time duration of steering corrections.

Other and different object and advantages of the present apparatus will appear in the following detailed description of a preferred embodiment of the invention, as illustrated in the accompanying drawings, wherein.

Figures 4, 5, 6, 7, 8:
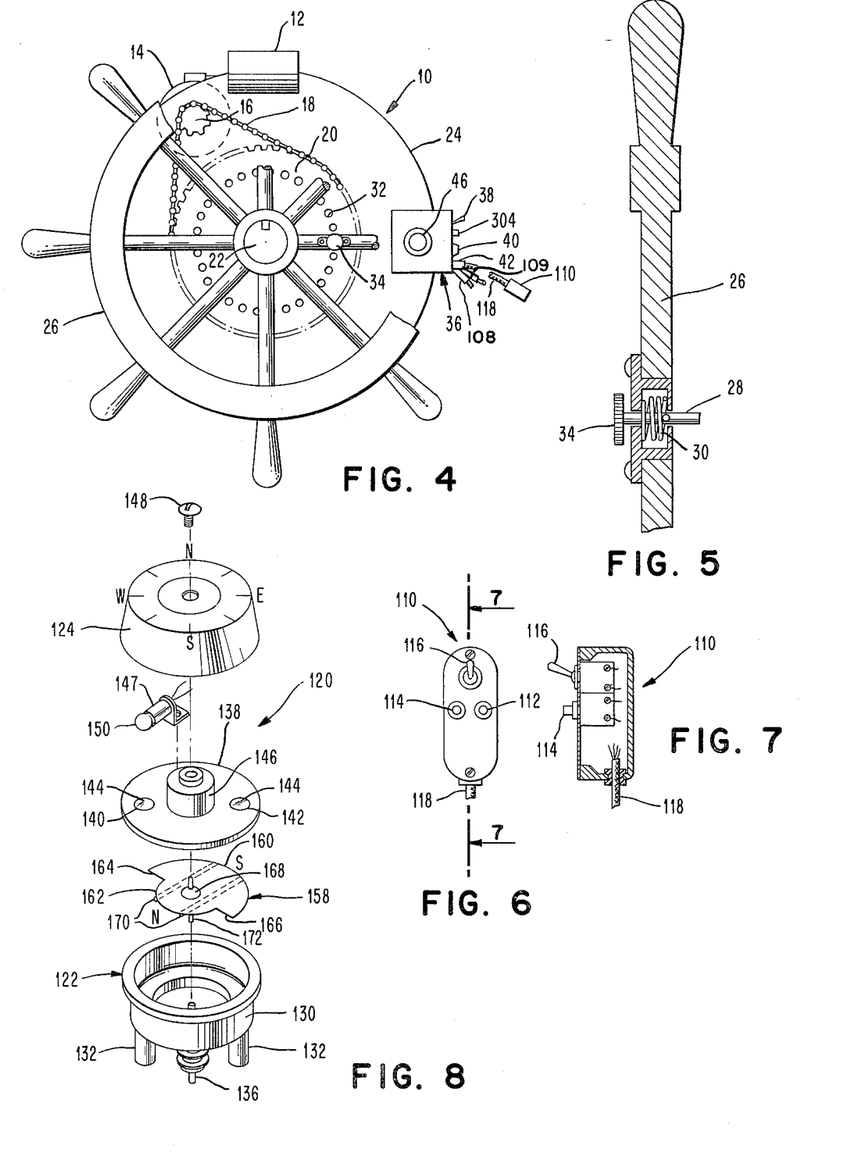
FIG. 4 is a front elevational view of the steering wheel control unit.
FIG. 5 is a detail view partly in section of a portion of the control wheel and engaging pin.
FIG. 6 is a top view of the remote control switch for the present invention.
FIG. 7 is a sectional view along the line 7—7 of FIG. 6.
FIG. 8 is an exploded isometric view of the binnacle of the present invention.

The present invention comprises, among other things, six major sub-assemblies as will now be described. Referring first to FIG. 4, there is shown a steering drive unit 10, provided with a D.C. compound, drive motor 12, coupled through a worm gear reducer unit 14, to a to a large sprocket wheel 20. Sprocket wheel 20 is to a larger sprocket wheel 20. Sprocket wheel 20 is secured to and rotatable with a steering shaft 22 which is journalled in and passes through a steering shaft mounting plate 24 for suitable attachment to the steering mechanism and rudder (not shown) of the vehicle e.g. ship. The plate 24 forms a demountable mounting support for the remainder of the apparatus enumerated hereinafter. A multi-spoked steering wheel 26 attached to steering shaft 22, e.g. by key and keyway, carries a steering wheel engaging pin 28 forwardly biased by spring 30 so as to be receivable in one of a plurality of circularly disposed apertures 32 in sprocket wheel 20. A knurled knob 34 on the end of a pin 28 permits the pin to be withdrawn and adjustably positioned to any selected aperture 32 so as to alter the angular position of wheel 26 for altering or changing the course of the vehicle as desired. A box-like enclosed assembly 36 secured to plate 24 includes a power "on-off" switch 38, a "power on" indicating lamp 40, a demountable fuse 304, and connector 42 for purposes hereinafter described. Also included is an externally adjustable turning rate control rheostat 46, for purposes to be described later on herein. The entire sub-assembly 10 is demountably secured to the vehicle steering shaft in a manner permitting it to be quickly and easily removed, serviced, repaired, adjusted and remounted.

Figure 10:
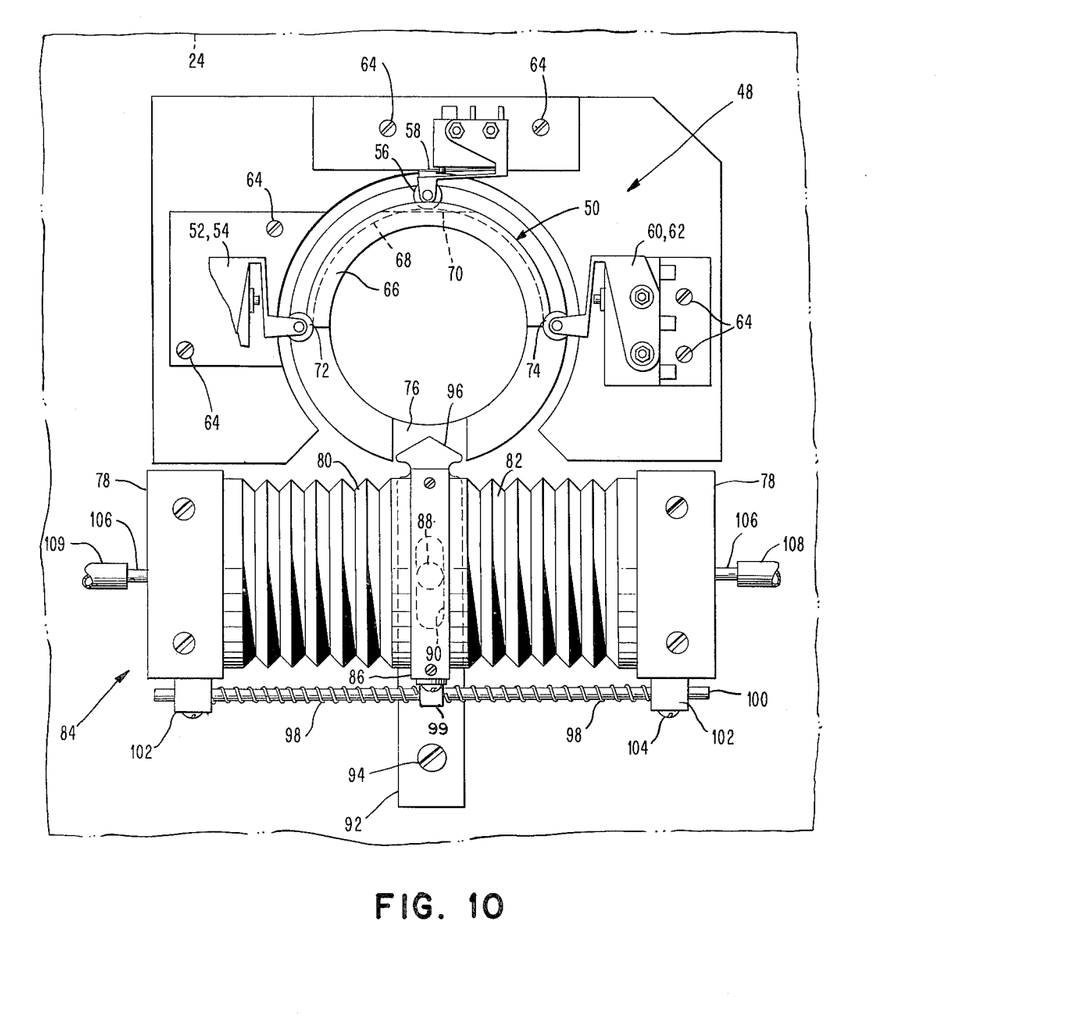
FIG. 10 is a view of the control switches and bellows mechanism of the invention.

Attached to the rear surface of the bracket 24, as seen in FIG. 10 is a steering drive control sensor unit 48 including a main steering shaft control cam 50 secured to the main sprocket steering wheel 20 in a suitable manner and rotatable therewith. Disposed quadrantally about the periphery of the cam 50 are three pairs of micro-switches e.g. momentary contact type, designated by reference characters 52, 54, 56, 58, 60 and 62 (also FIG. 1) secured to the mounting bracket by mounting-screws 64. The actuator arm of each switch carries a follower roller adapted to ride along the lobe of the cam and each is effective to activate and/or deactivate its respective switch, as will hereinafter be described. Switches 52 and 60 are characterized as drive motor dynamic breaking signal controls. Switches 54 and 62 are "port" and "starboard" steering return controls. Switches 56 and 58 are steering limit control switches.

Raised cam lobe 66 is provided with a circular groove dotted outline 68 and a center flat spot or area 70 and includes oppositely disposed beveled edge portions 72 and 74, respectively, permitting the associated switch follower rollers to roll off the edges thereby to deactivate the respective switches when the roller reaches the extreme beveled position on either opposite side of the cam lobe. An enlarged cut out portion in the fourth quadrantal area of cam 50 forms a cam engaging slot 76 for purposes to be described presently.

Secured by end brackets 78 to the bracket 24 are a pair of rudder position feed-back senders or sensors e.g. bellows 80 and 82, of flexible material such for example as metal, rubber, etc. forming one portion of a pneumatic differential control unit 84. A bellows piston 86 is attached through the medium of a drive pin 88 and the slot 90, to an elongated bellows rocker arm 92. One end of arm 92 is pivoted by means of screw 94 to the bracket 24 for arcuate rocking movement thereof. The opposite end of rocker arm 92 is provided with a rocker arm cam surface 96 receivable and engageable in slot 76. Opposite "right-left," "left-right" excursions of rocker arm 92 are dampened and controlled by means of centering springs 98 encircling the spring guide bar 100. A block 99 secured to the member 92 effectively acts as a stop or abutment against which the confronting ends of springs 98 rest in the condition shown in FIGURE 10. The latter mechanism is mounted in relation to the bellows supports 78 by means of guide blocks 102 and screws 104. Pressure differential relative to the bellows is adapted to be transmitted therefrom by means of connecting pipes 106 and pneumatic tubing 108 and 109 disposed on opposite sides thereof, for purposes to be described later on herein.

The automatic course control apparatus of the present invention may be activated by means of a hand-held, remotely located, manually actuated, manual steering control unit (switch) 110 as seen in FIGS. 6 and 7. This latter unit includes port and starboard, push-button, momentary contact type switches 112 and 114 and a "manual-automatic" toggle switch 116. The switches of unit 110 are connected to the control package 36, FIG. 4, by means of a cable 118 through connector 42.

Figure 2:
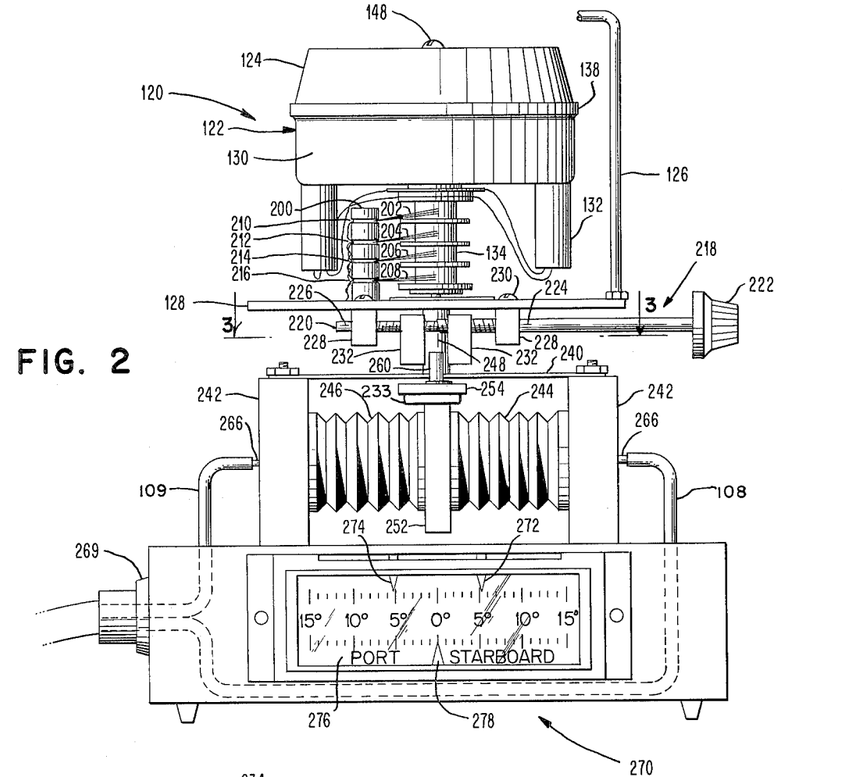
FIG. 2 is a front elevational view of the binnacle differential control apparatus for the invention.
Figure 9:
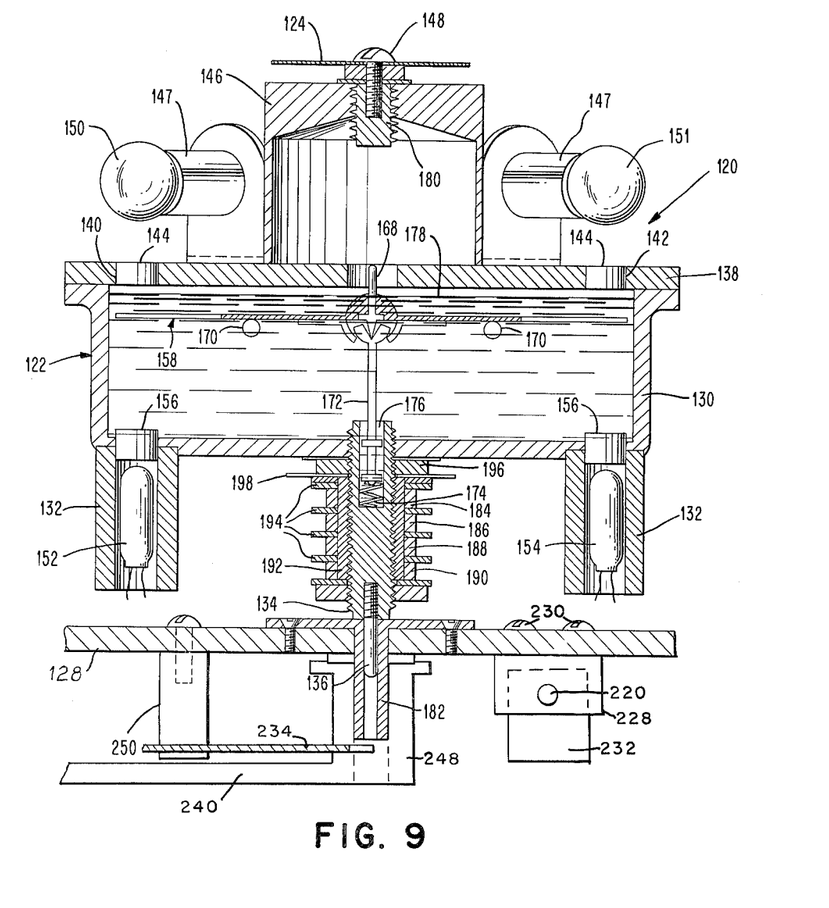
FIG. 9 is a greatly enlarged sectional view of the binnacle of FIG. 8.

A course selection control indicating unit 120 for the present apparatus as shown in FIGS. 2, 8 and 9 is seen to comprise a remotely located unitary assembly including a movable e.g. rotatable, binnacle 122 carrying a demountable, inverted, cup-like, compass rose 124 and provided with a pointer indicator 126 threadedly secured to a binnacle base mounting plate 128 on which the binnacle 122 is movably disposed. The binnacle 122 comprises a shallow, cup-shaped binnacle bowl 130 provided with oppositely disposed depending, hollow, cylindrical, projections 132, open at both ends for purposes to be described presently, and a threaded central slip-ring contact shaft or stem 134, FIG. 9, of insulating material having a threaded depending mounting or pivot pin 136 extending away therefrom. A cover 138 closes the upper open end of the binnacle bowl 130 and is provided with oppositely disposed apertures 140 and 142 each of which is provided with a light transmitting window 144—144 therein. A central, hub-like protuberance 146 acts as a support for the compass rose 124 which is secured thereto by means of a screw 148. Oppositely disposed lamps 150 and 151, FIG. 9, are suitably mounted on the cover 138 by means of sockets 147 with their respective filaments oriented over a respective aperture 140 and 142. Individual photoelectric cells 152 and 154 are disposed within respective hollow projections 132 adjacent individual protecting windows 156 disposed in the upper end of each projection.

An opaque screen or direction disk 158 having a large half circular portion 160, FIG. 8, and a smaller half circular portion 162 terminating in opposite edge portions 164 and 166 is provided with a metal-jewel bearing pivot 168 and a pair of oppositely disposed, spaced, parallel, bar magnets 170—170. Screen 158 is loosely mounted on the upper end of a vertically disposed bearing post 172, the latter being resiliently mounted on a short balancing spring 174 within a hollow bore 176 in the upper end of the central contact shaft 134. Oscillation of direction disk 158 produced as a result of any pitching, rolling movements, etc. of the vehicle is controlled by immersing the disk in a damping fluid 178 contained in binnacle bowl 130, the latter being filled through port 180 which is adapted to be sealed closed by the aforementioned screw 148. Pivot pin 136 is rotatably received in a base plate collar insert axle forming member 182 mounted on and extending into and through the binnacle base plate 128.

The screening area of the opaque disk 158 is of such proportions that in maintaining the desired vehicle heading, opposite edges 164 and 166 thereof will obstruct or occlude the path of light from lamps 150–151 passing through windows 140 and 142 and 156 to photocells 152 and 154. Thus, the slightest deviation of the angular relation between the edges 164 and 166 of the screen and the beams of light exposes one or the other photocell to a varying intensity light ray within the limits imposed by the width of the light beam thereby to produce a corresponding direction error signal. The output signal generated by the photocell is fed out from the photocell to other associated apparatus by means of the mechanism now to be described.

Mounted axially of shaft 134 are four conductive slip rings 184, 186, 188 and 190 electrically insulated therefrom by a dielectric liner 192 and insulated from each other by means of insulating washers 194. The slipring shaft 134 is rotatably mounted so as to turn with the binnacle bowl 130 by means of a collar 196 and conductive ground washer 198. Washer 198 acts as a common ground tie point for lamps 150 and 151 and photocells 152 and 154.

A vertically disposed dielectric post or shaft 200, FIG. 2, adjacent to shaft 134 supports four horizontally extending spring contact arms 202, 204, 206, and 208 which are adapted to contact respective slip rings thereby to provide signal and ground return points for conductors 210, 212, 214 and 216 for purposes which will become clear hereinafter. Output leads for each of the foregoing contact arms are cabled together and fed to appropriate sections of the associated electrical circuitry of FIG. 1, as will hereinafter be described.

Figure 3:
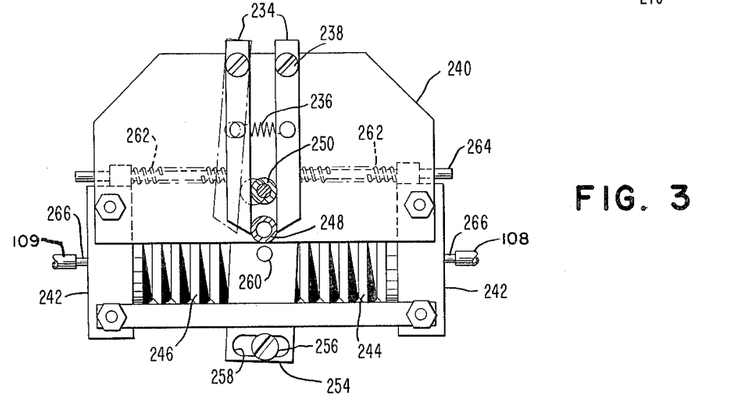
FIG. 3 is a view along the line 3—3 of FIG. 2.

Located directly below the compass binnacle is a mechanical displacement control adjustment member 218 comprising an elongated shaft 220 provided with an adjustment knob 222 and oppositely disposed differentially threaded portions 224 and 226. Shaft 220 is carried by supporting blocks 228—228 attached by screws 230 to the mounting plate 128 so as to permit oppositely disposed compression blocks 232—232 also carried by shaft 220 to move toward and away from each other for purposes to be described. The depending end of member 182 is received within a short supporting collar 248 extending vertically upwardly from the mounting plate 240 adjacent the tapered ends of a pair of jaw-like-members 234—234, FIG. 3. Depending from the binnacle mounting plate 128 is a stub shaft 250 adapted to be received between the jaw-members 234 effectively spreading or contracting the pair of parallel spaced apart jaw-like-members 234—234 (dotted outline), FIG. 3, against the biasing tension of spring 236. Members 234 are pivoted by means of screws 238 on the bracket or plate 240 extending between oppositely disposed end blocks 242—242 between which a pair of driven control bellows 244 and 246 are disposed. This mechanism acts in the nature of a counter balancing and dampening force to base plate rotation.

A bellows piston 252 to which inner ends of sensor means e.g. bellows 244 and 246 are attached carries a bellows rocker arm 254, secured thereto by means of anchor plate 233 and adjusting screw 256 and riding in slot 258 permitting angular adjustment of rocker arm in relation to the piston center axis. A drive pin 260, projecting vertically upwardly from rocker arm 254 is adapted to engage one or the other of the blocks 232—232 for moving or driving the binnacle, as hereinafter described. Centering and return springs 262 encircling guide shaft 264 dampen and limit the travel of the rocker arm and piston. Pressure differential is transmitted to and from the two driven bellows 244 and 246 by means of connecting pipes 266 and pneumatic tubing 108 and 109 through connector 269 interconnecting with drive bellows 80 and 82 via assembly 36, FIG. 4.

Beneath the compass binnacle is located a relay microammeter control mechanism 270, FIG. 2, including a starboard and port contact 272 and 274 each of which is adjustable over a degree scale 276 e.g. 15° of off-course error control for a desired angular course setting thereby to provide manual selection over the amount of tolerable error signal produced by the compass binnacle. A zero or center contact indicator 278 is arranged relative to the contacts 272 and 274 so that an output signal will be supplied therefrom for purposes hereinafter described whenever pointer 278 becomes coincident with one or the other contacts 272 or 274.

As will become more apparent as the following description unfolds, the relay microammeter senses the amplitude of the current produced by the photocells. This current has a certain range of values. When the current reaches the peak of this value range it will reach a steady state condition at which point there will be no further change in the current. The relay meter is adapted to display upon its face, i.e. scale, the change of this current output until it attains the steady state condition, which therefore allows sensing and display of small magnitude off-course error signals produced by the binnacle. When the current causes the movable pointer to become coincident with the preadjusted contacts (right or left) an output signal is sent to the steering control devices hereinafter described causing the steering apparatus to move the rudder or other steering control apparatus in a direction to correct for the aforementioned error signal within the tolerances established by the relay meter.

The mechanical displacement control adjustment shaft is provided in the present apparatus as will likewise become more apparent subsequently to compensate for the vehicle characteristic. It acts as a manual control for adjusting the ratio of the main cam rotation to the binnacle rotation. This shaft is employed in the steering feed-back loop of this control apparatus to cause the vehicle error heading to become coincident with the vehicle's angle of attack effectively minimizing course overshoot.

Figure 1:
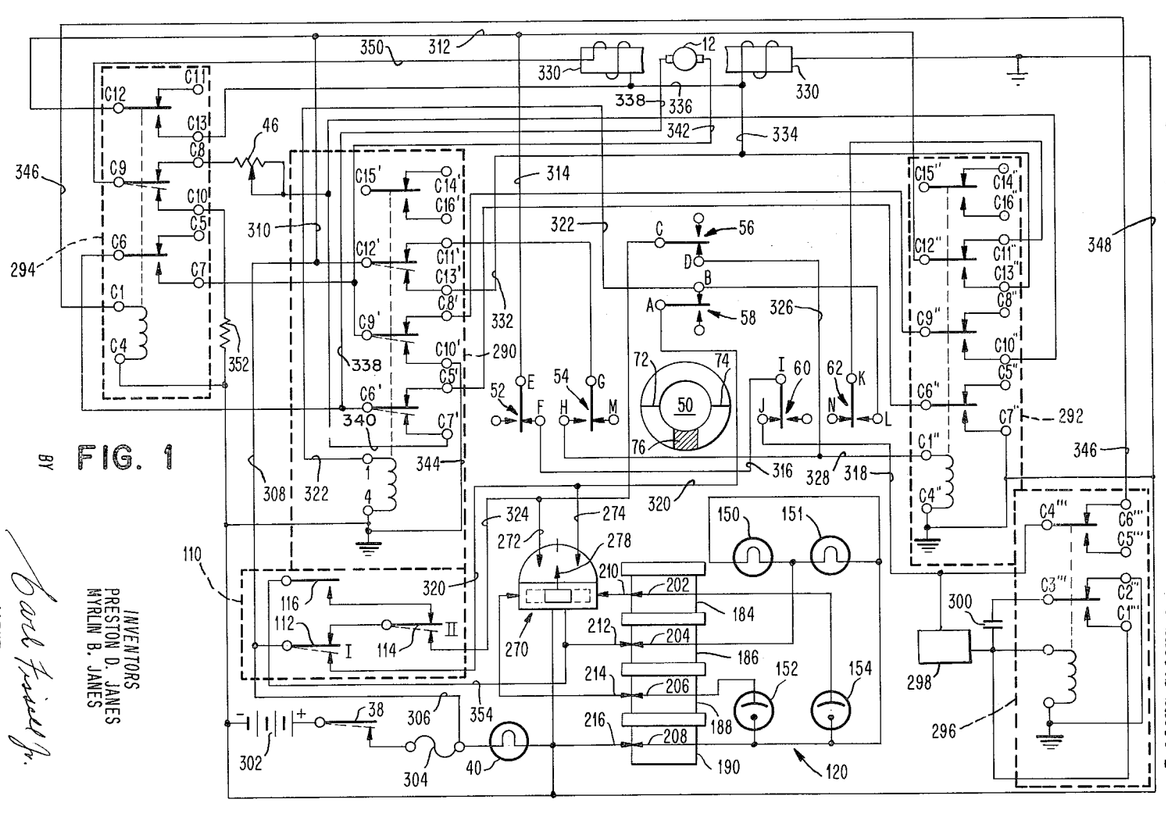
FIG. 1 is an idealized electrical schematic diagram of the present invention.

The steering drive control unit of the present invention, FIG. 1, is seen to include electromagnetic, multi-contact, steering direction motor control relays 290 and 292, each provided with an operate winding, a time adjustable dynamic braking relay 294 and an R-C time delay control relay 296, including potentiometer 298 and capacitor 300. The electrical control circuit including the aforementioned components is energized by means of a storage battery 302, e.g. 12-volt marine type, via switch 38 through a fuse 304.

In the operation of the present invention with main cam 50 in its neutral position, closure of switch 38 (dotted outline) energizes the winding of relay 296 and supplies power to certain of the control elements of the circuit as will now be described via interconnecting leads 306, 308, 310, 312, 314, switch 52, lead 316, switch 60, lead 318, and potentiometer 298. The positioning of "man.-auto." switch 116 will control the energizing of the lamps 150 and 151 and the application of power to the relay meter 270, thereby activating the course selection control unit 120. It should be noted that switches 112, 114 and 116 are electrically connected in series effectively functioning as a three input, AND gate for the power source of the course selection control unit. Thus, manual steering control may be accomplished at any time thereby overriding the automatic control signals emanating from the relay meter 270 via contacts 272 or 274.

Directional control over vehicle steering is accomplished by means of the relays 290 and 292 which act in the nature of a flip-flop element in the steering control circuit. Depending upon their contact state or condition, they supply a voltage input to the armature of driving motor 12. The electrical energizing input signals to relays 290 or 292 are voltage level steering signals resulting either from the the closure of manual steering control switches 112 or 114 or from the relay meter settings 272, 274 acting in combination with 278. With "on-off" switch 38 closed, closure of either switch 112 or 114, with switch 116 open (manual steering control mode), completes a circuit I, from the positive side of battery 302, through switch 38, and fuse 304, over conductor 306, via switch 112, over conductor 320, via contacts A and B of switch 58, over conductors 322 to energize the coil (not otherwise identified) of relay 290, thence back to ground, i.e. to the negative terminal of battery 302.

Closure of switch 114 completes a circuit II, via conductor 324, to contacts C and D of switch 56, over conductors 326 and 328 to energize the coil (not otherwise identified) of relay 292, thence back to ground, i.e. via conductor 348 to the negative terminal of battery 302.

Energization of relay 290, for example, causes the relay contacts identified with a double prime and a dashed line in FIG. 1 to close. This completes a circuit to the armature (not otherwise identified) and field windings 330—330 of motor 12. From the positive terminal of battery 302 current is fed through switch 38, fuse 304, conductor 308, through closed relay contacts C12' and C13', over conductor 332, over conductor 334 to the right hand winding 330. Here the current divided. The right hand path is through the winding 330 back to the negative terminal of battery 302. The left hand path is over conductor 336, through left winding 330, FIG. 1, via conductor 350, through normally closed relay contacts C9 and C10 of relay 294, through rheostat 46, via conductor 340, over closed contacts C7' and C6' of relay 290, via conductor 338 into and through the armature of motor 12, thence via conductor 342, back to contacts C9' and C10' of relay 290 to the ground return path, i.e. back to the negative terminal of battery 302. The above described contact arrangement with relay 290 energized and relay 292 deenergized (this relay effectively acting as a flip-flop) causes armature rotation of motor 12. Reversing the direction of the motor is accomplished by reversing the states of the relays which effectively reverses the signal and ground return path for the armature on conductors 340 and 342. Speed control of motor 12 is accomplished by the rheostat 46 which is adapted to vary, e.g. raise or lower, the armature input voltages.

The angular rotation and direction of the drive motor 12 as controlled by the above-mentioned apparatus, causes a proportional rotation of the chain and sprocket drive wheel 20 which produces an equal rotation of steering wheel 26 locked thereto by the pin 28, as previously described. This rotative movement effects angular displacement of the main steering drive control cam 50. Arcuate displacement of the steering shaft control cam 50 of less than 1° from center position (neutral position of vehicle rudder) deactivates brake control switch 52 or 60 and activates steering return control switch 54 or 62 depending upon the direction of rotation of cam 50.

Continuous steering in one direction may be accomplished until a maximum angular displacement of cam 50, e.g. 89.5 degrees from center, causes one or the other of the opposite edge portions 72 or 74 to activate the respective limit control switch 56 or 58 which in turn controls the activation of port and starboard steering relays 290 and 292, which operation has been described previously. This action interrupts the signals to the drive motor 12, halting further rudder movement. With the leading edge 72 or 74 of cam 50 reaching center position, and limit control switch 56 or 58 being activated through the movement of their respective contact arms, an open circuit condition occurs which removes the voltage being supplied to the respective motor steering control relay 290 or 292 over conductors 322 or 328. Simultaneously with this action, the combination of switches 52 and 54 or 60 and 62 will close as a result of the follower dropping into the indent surface 70 of cam 50 thereby activating the motor dynamic brake control relay 294 as will now be described.

The dynamic brake control circuit is energized by means of the closure of contacts E and F of switch 52 via conductor 316, the closed contacts I and J of switch 60 and conductor 318 via contacts C4 and C6 of time delay control relay 296 now in their normally closed position (the displacement of the cam from center position having previously deactivated the relay) thereby supplying a voltage level to the coil of relay 294 via conductor 346. As a result of this action, the field and armature windings of motor 12 are returned to ground via conductors 348 and 350 through now closed contacts C9 and C10 of relay 294 and thence through shorting resistor 352 (used to dissipate the energy).

Control of the braking time (contacts C4 and C6 of relay 296) is accomplished by varying the positioning of potentiometer 298. This controls the R-C time constant for energizing the coil of relay 296, effecting the opening of contacts C4 and C6 which supplies the signal potential to the coil of relay 294. This dynamic braking of the drive motor 12 overcomes the inertia of the steering mechanisms and affords positive and accurate control over the positioning of the steering control cam in relation to switches 52, 54, 56, 58, 60 and 62.

The return of cam 50 to its center position is accomplished automatically, in the absence of steering commands, by means of switches 54 and 62. The automatic return control circuitry (movement of rudder back back to neutral position) utilizes the C11 and C12 contact position of steering control relays 290 and 292 in conjunction with the physical position of cam 50 to reverse the direction of the motor 12 in the absence of steering commands. Contact C12 is used as the power source to energize the opposite relay 290 or 292, and the position of cam 50, operating in conjunction with switches 54 and 62 accomplishes the flip-flop action of the relays. This function is automatic for all cases except when maximum steering has been reached (control cam 50 has moved through an arc of 89.5°) at which time the flip-flop action of relays 290 and 292 is disabled by virtue of the closure of contacts G and M of switch 54 and closure of contacts K and N of switch 62, thereby inhibiting the signal to relays 290 or 292 supplied over conductors 322 or 328. This action of the apparatus permits continuous maximum steering control over the moving object in either direction. Interruption of the turning movement of the moving object is accomplished manually by depressing the opposite steering direction control switch 112 or 114 which in turn will cause activation of the automatic return control circuitry as previously described. This is accomplished as a result of the closure or switch 112 or 114 which in turn energizes the respective relay 290 or 292. Cam 50 then rotates and in doing so moves the indent surface 70 away from its relative position with respect to switches 52 and 54 or 60 and 62 closing contact G and H of switch 54 or K and L of switch 62. Closure of these contacts provides a voltage level on either conductor 322 or 328 thereby supplying a potential to the coils of steering control relays 290 and 292 over conductors 322 and 328 via switches 56 and 58. Automatic return of the steering mechanism to the center position will continue until one of the following two conditions, as hereinafter described, is met. One condition is that an external steering signal is received which is of the opposite direction to the return direction, thereby energizing the steering control relay 290 or 292 and causing the return signal to be interrupted due to contacts C11 and C12 on either relay opening. It is noted that contact C12 of relays 290–292 provides the voltage source for either energizing the opposite control relay or activating the drive motor 12, depending upon its normally open or closed position.

The other condition is that which occurs when the cam 50 has returned to its center position. The beveled edges 72 and 74 of the cam simultaneously open contacts G and H of switch 54 or K and L of switch 62, and close contacts E and F of switch 52 or I and J of switch 60, depending upon direction of rotation of the cam. In this manner, the return signal to relay 290 or 292 is discontinued and the dynamic brake is activated, positioning the cam to within approximately ±1° of center.

Course correction steering is returned to the automatic mode by means of closing switch 116. This supplies voltage to the photocell lamps 150–151 of the binnacle 120 over line 354 and conductors 204 via slip ring contacts 186 and 190, contact 190 supplying the ground path over conductor 216. In setting the course selection control unit to maintain a moving object on a predetermined course automatically, relative to the earth's magnetic field, the binnacle 120 is rotated about the pivot shaft 136 causing the photocells 152 and 154 in the binnacle oriented to "east" and "west," respectively, to be aligned to the desired heading. The heading deviation from magnetic north can be determined by consideration of the 360 degree marking of the direction disk 158 with respect to the pointer 126 carried by the binnacle base plate 128 upon which the stub shaft 136 rests. With the binnacle heading thus set, and the object responding, the deviation of the object from this desired course will instantaneously be corrected for by the interaction of the mechanism of the course selection control unit upon the steering mechanism of the present apparatus.

The output error signal delivered by either photocell, produced by the impingement of light thereon, is fed to the relay microammeter 270 over conductors 210 and 214 and is displayed as angular heading deviations or errors on the meter dial face 276, by movement of pointer 278. The dial face 276 is calibrated in 1 degree increments from center position "0" providing a maximum sensing angle of 15 degrees in either the port or starboard directions. The movement of the pointer 278 is a function of the current output of the photocells as related to the amount of light intensity falling upon each cell. This intensity is controlled by the leading edges of the direction disk 158 cutting the respective light path as the binnacle (moving object) rotates in relation to the disk. These output error signals in the form of steering commands are sent to the respective relays 290 or 292 over conductors 320–324, depending upon the position of contact pointers 272 and 274 which will allow manual control over the magnitude of "off-course" error signal that will be compensated for by the steering mechanism of the present invention, therefore establishing a steering correction tolerance. Steering commands will be generated when the angular movement of pointer 278 becomes coincident with, or greater than the position setting of either pointer 272 or 274. Pointer 272 controls the signal relay 292 and pointer 274 controls the signal to relay 290.

The steering commands emanating from relay meter 270 will cause the steering control to be mechanized as previously described. However, the pneumatic differential feedback control 84 is employed to control the amount of steering commanded by the course selection control unit when operating in the automatic mode i.e. switch 116 "on." For purposes of operational description, the pneumatic control feedback loop is seen to comprise two pairs of bellows, the sensing bellows 80 and 82 and the binnacle drive bellows 244 and 246 coupled together by means of tubing 108–109 and 267–268 through connectors 269 and 42.

The sensing bellows 80 and 82 of the system, mounted on plate 24 are, as before mentioned, driven by rocker arm 92 which engages the cam slot 76 in cam 50. Rocker arm 92 translates the angular motion of the steering mechanism thru cam 50 into rectilinear motion through the bellows system by means of the common piston 86. Angular displacement of rocker arm 92 in either direction from center will cause a corresponding displacement in the bellows piston 86 thereby compressing either chamber 80 or 82 of the bellows. Compression of either bellows chamber by the piston causes a pressure differential in the normal ambient of one atmosphere to be translated directly until the equilibrium point is reached by means of ports 106—106 over flexible lines 108 and 109 to the bellows chambers 244 and 246 of the course selection control unit 120. The relationship of the cam 50 (acting as a pinion gear) to the rocker arm 92 and the drive bellows pressure differential to the course selection control unit bellows pressure differential is of such proportions that an approximately two-to-one ratio is realized between the angular displacement of the steering cam 50 and the corresponding angular displacement of the binnacle. Loop control over this fixed ratio, to account for the dynamics of the controlled system, is accomplished by means of apparatus hereinafter described.

Maximum displacement of the drive bellows piston 86 in either direction is accomplished when the steering shaft encompasses an angular rotation of approximately 32° in either direction from center. This loop gain relationship, which has been created by the displacement of the steering wheel from center position, is proportional to the steering turning rate, and thus, forms the feedback loop to control the steering signal being generated by the course selection control unit.

Positioning of the binnacle is effected by the engagement of the bellows driving arm 254 and drive pin 260 with the rotatable binnacle base plate 128 through the mechanical time delay shaft 220 by means of the adjustable compression blocks 232—232 and guide blocks 228, rotating about the axis of the magnetic direction disk 158. The angular displacement of the compass base mounting plate will cause a corresponding rotation of the compass binnacle in relation to the magnetic disk. This rotation will cause the photocells 152 and 154 in the binnacle, which represent the true angular orientation of the moving object (remembering that the cells are oriented in a fixed relation to the object's present position), to be displaced in the turning direction of the object e.g. ship, in an amount equal to the angle of attack (relation of the velocity vector to the thrust axis) at that instant of applied steering by the steering mechanism. This displacement is of such proportions that the bellows feedback control loop will continually reposition the photocells and lamps of the binnacle with respect to the fixed position of the magnetic direction disk 158 until coincidence is achieved between the lamps and the leading edges 164, 166 of disk 158, thereby interrupting the light rays to the cells, which in turn removes the steering signal, before the moving object has achieved the desired heading. The absence of steering signals to the steering control relays 290 or 292 will cause the automatic return of cam 50 to the center position, and thus movement of the rudder back to neutral position. This rotation of the cam will cause the bellows piston 86 to be returned to the neutral position by the movement of the cam drive. This movement returns the drive bellows chamber to the starting position or condition which in turn returns the course selection control unit bellows to the equivalent position and its drive piston to center position, thereby returning the photocells located in the binnacle to their true orientation in relation to the vehicle heading. The relation of the bellows return rate to the vehicle's angle of attack time derivative is of such proportions that the boat has reached the selected heading with minimum overshoot.

Positive control over the bellows feedback system is accomplished by means of the mechanical time delay shaft 220. The mechanical time delay shaft will allow up to 4 degrees of freedom on either side of its center position for the bellows engagement by means of rotating shaft 220 about its center causing the engaging blocks 232—232 to displace in relation to the driving arm pivot 260.

The mechanical time delay shaft and associated mechanism as aforementioned provides a manual control to adjust for the engagement (or control the gain) of the steering feedback sensor (bellows), the gain of which is a function of the vehicle dynamics. Thus adjustment of the binnacle's angular displacement during steering is manually controlled to account for changes in dynamic conditions effecting vehicle control.

Additional compensation for steering signal control is derived from the settings on relay meter 270, as previously described herein.

The foregoing description makes it clear that the course selection control unit produces a steering signal or signals as a result of the drift or other movement of the vehicle from the desired course heading and the binnacle feedback mechanism. The relay meter controls the tolerance placed on these off-course error or steering signals. The steering signal is translated into a mechanical displacement of the vehicle steering rudder from center. The cam and rocker arm of the drive bellows translates this displacement into movement of the bellows. The pressure differential thus created is passed back to the binnacle via its bellows, piston and rocker arm, angularly displacing the binnacle an amount equal to the change in the angle between the velocity vector and the actual heading or vehicle thrust axis, as a result of the rudder positioning.

Stated in a slightly different manner, the heading results in the production of a steering signal which is controlled, within present limits by the relay meter as to whether or not steering is accomplished. The signal output from the relay meter is utilized to turn the rudder which in turn not only changes the heading of the vehicle but the relation of the corresponding velocity vector as well. The velocity vector leads the thrust axis of the vehicle by a certain number of degrees depending on such factors as thrust impulse, motor speed, perturbing forces, etc. As turning is accomplished, the sensor units (bellows) senses the angular timing rate and feeds this signal back to the binnacle indicating in essence that the velocity vector is approaching or becoming coincident with the desired heading. The time delay shaft provides adjustment whereby when the velocity vector becomes coincident with the desired heading sensed by the compass, the latter having been positioned of its normal center position—binnacle—steering is automatically terminated.

What is claimed is:
1. Automatic pilot control apparatus comprising,
   (a) a vehicle steering wheel including means for providing a desired course heading,
   (b) means for moving said wheel in either of two opposite directions as desired,
   (c) means effective to control said wheel moving means,
   (d) pressure differential means operably associated with said wheel and said wheel moving means for producing a change in pressure depending upon the angular displacement of said wheel,
   (e) a compass binnacle including means for indicating a compass heading relative to true north,
   (f) pressure differential means operably associated with said compass binnacle for driving the same, and including means for producing an electrical signal indicative of the binnacle displacement,
   (g) means interconnecting said pressure differential means whereby said compass binnacle is angularly displaced by the motion of said wheel thereby producing a compensating steering signal,
   (h) means for feeding said steering signal to said driving control means for moving said wheel to angularly correct the wheel heading simultaneously displacing said binnacle by an amount equal to the change in angle between the driven vehicle velocity vector produced and the actual heading until the velocity vector becomes coincident with the desired heading effectively terminating the steering signal.
2. The invention according to claim 1 wherein said pressure differential means comprises a pair of bellows members and includes an operating piston therebetween for effecting bellows displacement in either of two opposite directions as a result of said wheel movement.
3. Automatic pilot control apparatus comprising,
   (a) a vehicle steering wheel including means for ad- justing the wheel to provide a desired course heading,
(b) means for driving said wheel in either of two opposite directions as desired,
(c) means effective to control said driving means,
(d) pressure differential means operably associated with said wheel and said driving means for producing a change in pressure depending upon the angular displacement of said wheel,
(e) a compass binnacle including means for indicating a compass heading relative to true north,
(f) pressure differential means operably associated with said compass binnacle for driving the same, and including means for producing an electrical signal indicative of the binnacle displacement,
(g) means for sensing the current amplitude of the steering signal and displaying the same within pre-established limits,
(h) means interconnecting the two pressure differential means whereby said compass binnacle is angularly displaced by the motion of said wheel thereby producing a compensating steering signal as a result of said displacement,
(i) means for feeding said signal to said driving control means for rotating said wheel to angularly correct the wheel heading simultaneously displacing said binnacle by an amount equal to the change in the wheel heading and the change in angle between the driven vehicle velocity vector produced and the actual heading until the velocity vector becomes coincident with the desired heading effectively terminating the steering change.

4. The invention according to claim 3 wherein said current amplitude sensing means comprises a relay meter including adjustable means for varying the tolerance limits as desired.

5. The invention according to claim 4 wherein said relay meter comprises a microammeter including one or more adjustable contacts and an indicating pointer for either of two steering directions for selectively adjusting the range of values between which the indicating pointer is adapted to move and beyond which the meter produces an electrical off-course error signal output for application to said control means.

6. Automatic pilot control apparatus comprising,
(a) a demountable vehicle steering wheel including means for adjusting the wheel to provide a desired course heading,
(b) means for driving said wheel in either of two opposite directions as desired,
(c) electromagnetic signal responsive means effective to control said driving means,
(d) pressure differential means operably associated with said wheel and said driving means for producing a change in pressure depending upon the angular displacement of said wheel,
(e) a compass binnacle including means for indicating a compass heading relative to true north,
(f) pressure differential means operably associated with said compass binnacle for driving the same, and including means for producing an electrical signal indicative of the binnacle displacement,
(g) means operably associated with said binnacle effective to establish a tolerance for engaging and driving said binnacle,
(h) means interconnecting the two pressure differential means whereby said compass binnacle is angularly displaced by said wheel thereby producing a compensating course correcting signal as a result of said displacement,
(i) means for feeding said signal to said driving control means for rotating said wheel to angularly correct the wheel heading simultaneously displacing said binnacle by an amount equal to the change in angle between the velocity vector produced and the actual heading until the velocity vector becomes coincident with the desired heading effectively terminating the steering change.

7. The invention according to claim 6 wherein said means for establishing a tolerance for engaging and driving said binnacle comprises an adjustable differentially threaded shaft and means coupling said shaft to said bellows whereby said bellows is compressed or expanded depending upon the degree of travel of said coupling means.

8. Automatic pilot control apparatus comprising,
(a) a demountable vehicle steering wheel including means for adjusting the wheel to provide a desired course heading,
(b) means for driving said wheel in either of two opposite directions as desired,
(c) a pair of signal responsive electromagnetic relays effective to control the direction of movement of said driving means,
(d) pressure differential means operably associated with said wheel and said driving means for producing a change in pressure depending upon the angular displacement of said wheel,
(e) a compass binnacle including a compass rose and indicator for indicating a compass heading relative to true north,
(f) pressure differential means operably associated with said compass binnacle for driving the same and including a plurality of conductive slip rings engageable with respective wiper contactors for producing an electrical signal indicative of the binnacle displacement,
(g) means interconnecting the two pressure differential means whereby said compass binnacle is angularly displaced by said wheel thereby producing a compensating signal as a result of said displacement,
(h) means for feeding said signal via said slip rings and contactors to said relays for rotating said wheel to angularly correct the wheel heading simultaneously displacing said binnacle by an amount equal to the change in angle between the velocity vector produced and the actual heading until the velocity vector becomes coincident with the desired heading effectively terminating the steering change.

9. Automatic pilot control apparatus comprising,
(a) a demountable vehicle steering wheel including means for adjusting the wheel to provide a desired course heading,
(b) means for driving said wheel in either of two opposite directions as desired,
(c) a pair of signal responsive electromagnetic relays effective to control the direction of movement of said driving means,
(d) a dynamic brake control relay operably associated with said driving means and including an adjustable RC network for controlling the energization and de-energization of said driving means,
(e) pressure differential means operably associated with said wheel and said driving means for producing a change in pressure depending upon the angular displacement of said wheel,
(f) a compass binnacle including a compass rose and indicator for indicating a compass heading relative to true north,
(g) pressure differential means operably associated with said compass binnacle for driving the same and including a plurality of conductive slip rings engageable with respective wiper contactors for producing an electrical signal indicative of the binnacle displacement,
(h) means interconnecting the two pressure differential means whereby said compass binnacle is angularly displaced by said wheel thereby producing a compensating signal as a result of said displacement,
(i) means for feeding said signal via said slip rings and contactors to said relays for rotating said wheel to angularly correct the wheel heading simultaneously displacing said binnacle by an amount equal to the change in angle between the velocity vector produced and the actual heading until the velocity vector becomes coincident with the desired heading effectively terminating the steering change.

10. Automatic pilot control apparatus comprising,
(a) a demountable vehicle steering wheel including means for adjusting the wheel to provide a desired course heading,
(b) means for driving said wheel in either of two opposite directions as desired,
(c) means including an electromagnetic relay and a potentiometer in circuit therewith for adjusting and controlling the speed of said driving means,
(d) a pair of signal responsive electromagnetic relays effective to control the direction of movement of said driving means,
(e) pressure differential means operably associated with said wheel and said driving means for producing a change in pressure depending upon the angular displacement of said wheel,
(f) a compass binnacle including a compass rose and indicator for indicating a compass heading relative to true north,
(g) pressure differential means operably associated with said compass binnacle for driving the same and including a plurality of conductive slip rings engageable with respective wiper contactors for producing an electrical signal indicative of the binnacle displacement,
(h) means interconnecting the two pressure differential means whereby said compass binnacle is angularly displaced by said wheel thereby producing a compensating signal as a result of said displacement,
(i) means for feeding said signal via said slip rings and contactors to said relays for rotating said wheel to angularly correct the wheel heading simultaneously displacing said binnacle by an amount equal to the change in angle between the velocity vector produced and the actual heading until the velocity vector becomes coincident with the desired heading effectively terminating the steering change.

References Cited by the Examiner
UNITED STATES PATENTS

| 2,925,060 | 2/1960 | Weeks | 114—144 |
| 3,111,105 | 11/1963 | Bentkowsky et al. | 114—144 |
| 3,133,520 | 5/1964 | Bentkowsky et al. | 114—144 |

MILTON BUCHLER, *Primary Examiner.*

ANDREW H. FARRELL, *Examiner.*

UNITED STATES PATENT OFFICE
CERTIFICATE OF CORRECTION

Patent No. 3,232,262            February 1, 1966

Preston Douglas Janes et al.

It is hereby certified that error appears in the above numbered patent requiring correction and that the said Letters Patent should read as corrected below.

Column 2, lines 8 and 9, strike out "to a large sprocket wheel 20. Sprocket wheel 20 is to a larger sprocket wheel 20." and insert instead -- small gear 16. A drive chain 18 transmits rotative torque to a large sprocket wheel 20. --; column 7, line 23, strike out "back".

Signed and sealed this 3rd day of January 1967.

(SEAL)
Attest:

ERNEST W. SWIDER
Attesting Officer

EDWARD J. BRENNER
Commissioner of Patents